United States Patent
Aihara

(10) Patent No.: US 8,948,083 B2
(45) Date of Patent: Feb. 3, 2015

(54) MOBILE COMMUNICATION TERMINAL AND COMPUTER READABLE RECORDING MEDIUM

(75) Inventor: Hideaki Aihara, Higashiyamato (JP)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 1266 days.

(21) Appl. No.: 11/605,692

(22) Filed: Nov. 29, 2006

(65) Prior Publication Data

US 2007/0121536 A1 May 31, 2007

(30) Foreign Application Priority Data

Nov. 30, 2005 (JP) ................................ 2005-347035
Oct. 26, 2006 (JP) ................................ 2006-291047

(51) Int. Cl.
*H04W 48/18* (2009.01)
*H04W 84/12* (2009.01)
*H04W 88/06* (2009.01)
*H04W 52/02* (2009.01)

(52) U.S. Cl.
CPC .............. *H04W 48/18* (2013.01); *H04W 84/12* (2013.01); *H04W 88/06* (2013.01); *H04W 52/0254* (2013.01); *H04W 52/0261* (2013.01); *Y02B 60/50* (2013.01)
USPC ...... 370/328; 370/311; 455/151.2; 455/343.1

(58) Field of Classification Search
CPC ..... H04W 88/06; H04W 8/005; H04W 48/18; H04W 52/0261; H04W 84/12; H04W 52/02; H04W 52/0209; H04W 52/0277
USPC ......... 370/338, 311; 455/151.2, 343.1, 343.2, 455/343.5
See application file for complete search history.

(56) References Cited

U.S. PATENT DOCUMENTS

| | | | |
|---|---|---|---|
| 2005/0090262 A1* | 4/2005 | Hamano et al. | 455/445 |
| 2005/0165540 A1* | 7/2005 | Bando | 701/200 |
| 2006/0111136 A1* | 5/2006 | Song | 455/519 |

(Continued)

FOREIGN PATENT DOCUMENTS

| | | |
|---|---|---|
| JP | 11-252006 | 9/1999 |
| JP | 2003-060563 | 2/2003 |

(Continued)

OTHER PUBLICATIONS

Korean Office Action (with an English translation) issued in the corresponding foreign application No. 10-2006-0119274.

*Primary Examiner* — George Eng
*Assistant Examiner* — Jing Gao
(74) *Attorney, Agent, or Firm* — Cozen O'Connor

(57) ABSTRACT

An apparatus and method for reducing the power consumed by mobile communication terminal having a wireless LAN connection function. When a data communication operation is started, a control unit determines whether a connection to a wireless LAN is available, and if so, detects the battery remaining amount in a battery unit. If the battery remaining amount is equal to or greater than a first threshold, data communication is performed through the wireless LAN connection. When the battery remaining amount is smaller than the first threshold, a screen for recommending connection through cellular communication is displayed on a display unit. When the battery remaining amount becomes smaller than a second threshold, which is smaller than the first threshold, a power source control unit performs a predetermined power saving operation.

14 Claims, 6 Drawing Sheets

(56) References Cited

U.S. PATENT DOCUMENTS

2006/0223465 A1* 10/2006 Akiba et al. ............... 455/127.4
2006/0292986 A1* 12/2006 Bitran et al. ................ 455/41.2

FOREIGN PATENT DOCUMENTS

| | | | | |
|---|---|---|---|---|
| JP | 2004-180225 | 6/2004 | | |
| JP | 2004-289756 | 10/2004 | | |
| JP | 2004-349863 | 12/2004 | | |
| JP | 2005-086451 | 3/2005 | | |
| JP | 2005-156325 | 6/2005 | | |
| JP | 2006-180174 | 7/2006 | | |
| KR | 10-2005-0072314 | * 7/2005 | ............... | H04B 1/40 |
| KR | 1020050072314 | 7/2005 | | |
| WO | WO 01/22662 A1 | * 3/2001 | ............. | H04L 12/28 |
| WO | WO 2004/023741 | 3/2004 | | |
| WO | WO 2005043866 A1 | * 5/2005 | | |

* cited by examiner

FIG. 3A

WIRELESS LAN CONNECTION INFORMATION TABLE (191)

| PROVIDER | IDENTIFICATION INFORMATION (ESSID) | ENCRYPTION KEY | LOGIN ID | LOGIN PASSWORD | ... |
|---|---|---|---|---|---|
| AA | abcdef | ******** | aaa | ****** | ⋮ |
| BB | vwxyz | ******** | bbb | ****** | ... |
| ⋮ | ⋮ | ⋮ | ⋮ | ⋮ | ... |

FIG. 3B

POWER SAVING OPERATION SETTING TABLE (192)

| OBJECTIVE FUNCTION | CONDITION 1 (THRESHOLD 1) | OPERATION 1 | CONDITION 2 (THRESHOLD 2) | OPERATION 2 | ... |
|---|---|---|---|---|---|
| ⋮ | ⋮ | ⋮ | ⋮ | ⋮ | ... |
| WIRELESS LAN | BATTERY REMAINING AMOUNT LESS THAN 30% | DISPLAY RECOMMENDIATION TO SWITCH TO CELLULAR COMMUNICATION | BATTERY REMAINING AMOUNT LESS THAN 10% | DISPLAY WARNING + STOP OPERATION AFTER 30 SECONDS | ... |
| CELLULAR COMMUNICATION | ---- | ---- | BATTERY REMAINING AMOUNT LESS THAN 10% | DISPLAY WARNING + STOP OPERATION AFTER 30 SECONDS | ... |
| ⋮ | ⋮ | ⋮ | ⋮ | ⋮ | ... |

RECOMMENDATORY
CONNECTION SCREEN

WARNING SCREEN

MOBILE COMMUNICATION TERMINAL AND COMPUTER READABLE RECORDING MEDIUM

BACKGROUND OF THE INVENTION

1. Field of the Invention

The present invention relates to a mobile communication terminal and a computer readable recording medium, and particularly relates to a mobile communication terminal which is adapted to wireless LAN connection and which is suitable for being driven for a long time, and a computer readable recording medium storing a program for controlling a mobile communication terminal.

2. Description of the Related Art

Mobile communication terminals such as portable phones have a data communication function such as, for example, an Internet connection function, in addition to a basic function of calling function. Conventionally, in performing data communication with the use of a mobile communication terminal, it has been general to perform the communication through a mobile communication network (cellular network) utilizing a public line network. Recently, by providing a mobile communication terminal with a function of connecting to a wireless LAN, a connection mode through a public wireless LAN service (the so-called hotspot™) has also been put into practical use.

Since a mobile communication terminal of this kind also implements its basic function of calling function through a cellular network, its cellular communication function (mobile communication function) is kept in operation all time. Therefore, when this mobile communication terminal uses a wireless LAN, it performs the wireless LAN connection operation in addition to the usual mobile communication operation. Hence, the power consumed by the mobile communication terminal increases more than necessary if the wireless LAN function is kept in operation all time, and the drivable time of the mobile communication terminal becomes short. To solve such a problem, a method of reducing the power consumed by a mobile communication terminal having a wireless LAN connection function has conventionally been proposed, for example, in Unexamined Japanese Patent Application KOKAI Publication No. 2005-86451.

The technique disclosed in Unexamined Japanese Patent Application KOKAI Publication No. 2005-86451 aims for reducing the power consumed by a mobile communication terminal, by giving a notification from a server as to whether or not the mobile communication terminal is in an area in which a wireless LAN can be used, thereby to reduce the terminal's efforts of connecting to a wireless LAN for area searching purposes.

However, though the power to be consumed until before the communication is started can be reduced by this conventional technique, the power to be consumed after the communication is started has been left out of consideration. Therefore, a trouble such as, for example, the battery running out during connection to the Internet, might occur.

SUMMARY OF THE INVENTION

The present invention was made in view of the above-described circumstance, and an object of the present invention is to provide a mobile communication terminal having a wireless LAN connection function, which can more effectively reduce the power to be consumed, etc, and to provide a computer readable recording medium storing a program for a computer for controlling a mobile communication terminal.

To achieve the above object, a mobile communication terminal according to a first aspect of the present invention is a mobile communication terminal having a wireless LAN connection function and comprising:

a communication method determining unit which determines whether or not communication through a wireless LAN is available, upon a start of data communication operation; and a communication method selecting unit which selects a communication method to be used for the data communication operation, based on a battery remaining amount of the mobile communication terminal, in a case where the communication method determining unit determines that the communication through a wireless LAN is available.

The communication method selecting unit may select the communication method to be used for the data communication operation, by comparing the battery remaining amount with a predetermined first threshold.

The communication method selecting unit may select a wireless LAN as the communication method for the data communication operation in a case where the battery remaining amount is equal to or greater than the first threshold, and the communication method selecting unit may select mobile communication as the communication method for the data communication operation, in a case where the battery remaining amount is smaller than the first threshold.

The mobile communication terminal may further comprise an output unit which provides an output which allows a user of the mobile communication terminal to select a communication method, wherein the communication method selecting unit may select a wireless LAN as the communication method for the data communication operation, in a case where the battery remaining amount is equal to or greater than the first threshold, and the communication method selecting unit may control the output unit to provide an output which allows the user to select a communication method, and may select a method selected by the user as the communication method, in a case where the battery remaining amount becomes smaller than the first threshold.

The output unit may display a screen for allowing the user of the mobile communication terminal to select a communication method.

The mobile communication terminal may further comprise:

an output unit which notifies a warning to a user of the mobile communication terminal; and a control unit which causes the output unit to output, to the user, a warning that a power source will be turned off, and turns off the power source of the mobile communication terminal after a predetermined time passes, in a case where the battery remaining amount is smaller than a second threshold, which is smaller than the first threshold.

The output unit may display a screen for notifying the warning to the user of the mobile communication terminal.

To achieve the above object, a program stored in the computer-readable recording medium according to a second aspect of the present invention controls a computer for controlling a mobile communication terminal having a wireless LAN connection function to realize:

a function of determining whether or not communication through a wireless LAN is available, upon a start of an application which performs data communication;

a function of detecting a battery remaining amount of the mobile communication terminal, in a case where the communication through a wireless LAN is available;

a function of connecting to the available wireless LAN to perform communication, in a case where the battery remaining amount is equal to or greater than a predetermined threshold; and a function of performing an output for recommending communication through mobile communication, in a case where the battery remaining amount becomes smaller than the threshold.

The program stored in the computer-readable recording medium may control the computer to further realize a function of performing communication by switching to the mobile communication, in a case where the battery remaining amount becomes smaller than the threshold during connection to the wireless LAN.

According to the present invention, since it is possible to switch from a wireless LAN to mobile communication when the battery remaining amount is scarce, it is possible to effectively reduce the power consumed by the mobile communication terminal.

BRIEF DESCRIPTION OF THE DRAWINGS

These objects and other objects and advantages of the present invention will become more apparent upon reading of the following detailed description and the accompanying drawings in which:

FIG. 3A is a diagram showing an example of information stored in a storage unit illustrated in FIG. 2, and shows an example of information stored in an access information storage area;

FIG. 3B is a diagram showing an example of information stored in the storage unit illustrated in FIG. 2, and shows an example of information stored in a power saving setting storage area;

DETAILED DESCRIPTION OF THE PREFERRED EMBODIMENT

Figure 1:
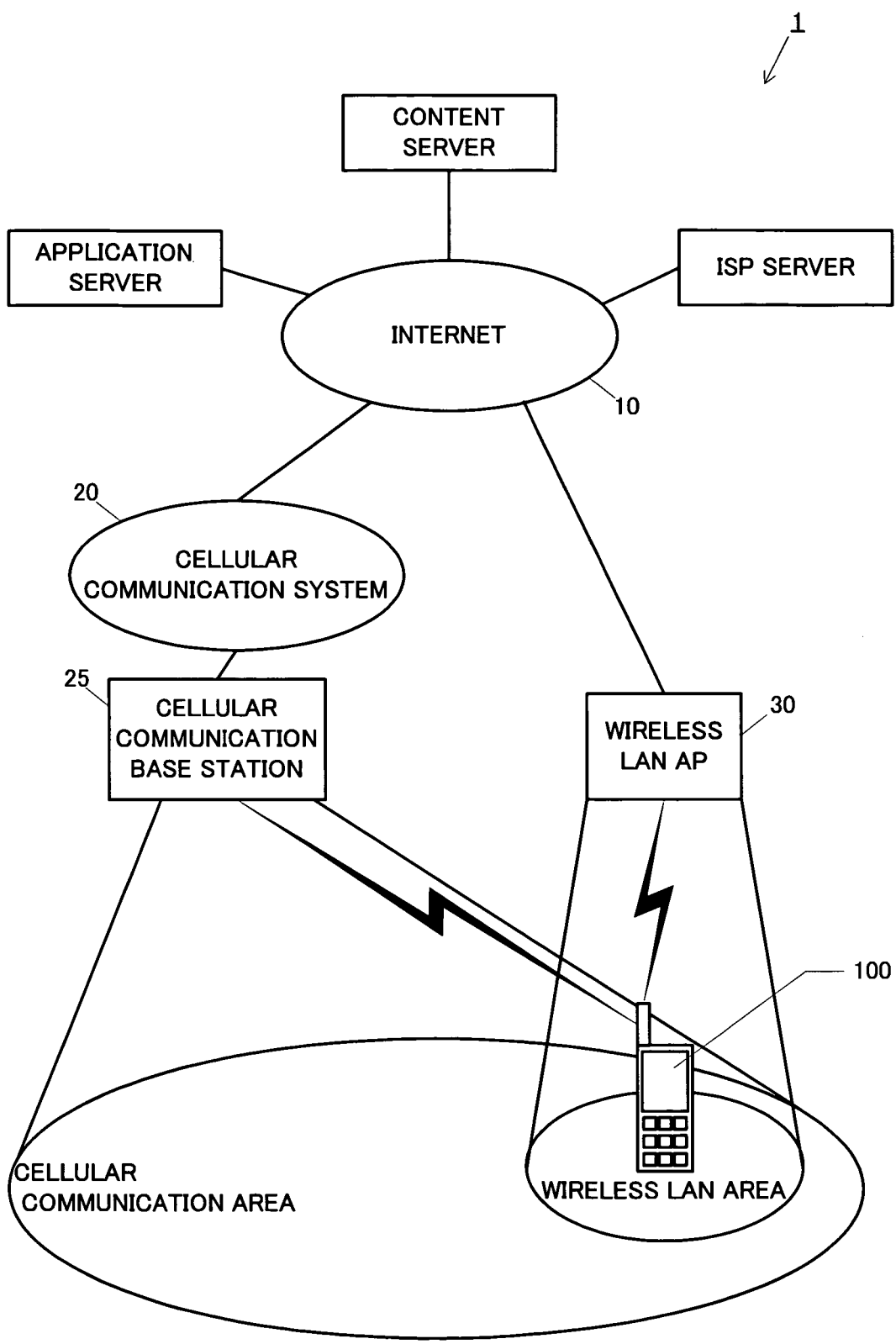
FIG. 1 is a diagram showing the structure of a mobile communication system according to an embodiment of the present invention.

An embodiment of the present invention will be explained below with reference to the drawings. First, with reference to FIG. 1, a mobile communication system according to an embodiment of the present invention will be explained. As illustrated, the mobile communication system 1 according to the present embodiment is at least a system realizing data communications by a mobile communication terminal 100 through Internet 10. The mobile communication system 1 includes a communication method through cellular communications (mobile communications) and a communication method through wireless LAN (Local Area Network) connection. For realizing cellular communications, the mobile communication system 1 comprises a cellular communication system 20 and a cellular communication base station 25. Further, for realizing wireless LAN connection, the mobile communication system 1 comprises a wireless LAN access point (AP) 30.

The cellular communication system 20 is a communication system provided by a mobile communication provider (a so-called carrier), and comprises, for example, a carrier center, a public line network or a communication network for connecting a plurality of cellular communication base stations 25 and the carrier center. The cellular communication base stations 25 are communication facilities for performing wireless communication with the mobile communication terminal 100, and are installed at plurality of locations within a service providing range. The mobile communication terminal 100 communicates with another mobile communication terminal 100 or the like through the cellular communication system 20, by wirelessly communicating with a nearby cellular communication base station 25.

The wireless LAN access point 30 is an access point for providing a public wireless LAN service, which is the so-called hotspot™, installed at a public facility or a shop, which is to serve as a service providing area. The wireless LAN access point 30 comprises a wireless communication device based on a wireless LAN standard such as, for example, IEEE802.11, and performs wireless communication with the mobile communication terminal 100. The wireless LAN access point 30 is operated by a public wireless LAN service provider (hereinafter referred to as "provider"), and regularly sends out identification information prescribed by the provider. In this case, the wireless LAN access point 30 regularly sends a beacon signal representing an ESSID (Extended Service Set Identifier) as identification information. Further, the wireless LAN access point 30 is connected to the Internet 10 through, for example, a backbone line (IP network) of the provider.

Next, the mobile communication terminal 100 will be explained. The mobile communication terminal 100 according to the present embodiment is a terminal device (telephone set) for mobile communication use such as a portable phone, a PHS (Personal Handyphone System), etc., and has a data communication function for performing data communications through a communication network such as the Internet 10 and accessing a web site, etc., in addition to a basic function of making calls. Further, the mobile communication terminal 100 according to the present embodiment has a wireless LAN connection function, besides a connection function through ordinary mobile communication (cellular communication).

That is, the mobile communication terminal 100 according to the present embodiment can perform the basic function of making calls through cellular communication, and can also perform data communication, for example, using Internet connection, etc. through cellular communication and wireless LAN connection.

When connecting to the Internet 10 through cellular communication, the mobile communication terminal 100 establishes connection to the Internet 10 through the cellular communication system 20 by wirelessly communicating with the cellular communication base station 25. In this case, data communication is performed according to a wireless communication scheme such as, for example, CDMA (Code Division Multiple Access). Then, the gateway function or the like possessed by the carrier center or the like included in the cellular communication system 20 performs protocol conversion, etc., thereby realizing data communication through the Internet 10. In case of such cellular communication, data communication is normally performed at a data transfer rate of about several hundred kbps.

On the other hand, in case of connecting to the Internet 10 through the wireless LAN connection function, the mobile communication terminal 100 establishes connection to the Internet 10 by wirelessly communicating with the wireless LAN access point 30. In this case, data communication through the Internet 10 is realized based on a communication protocol such as, for example, TCP/IP (Transmission Control Protocol/Internet Protocol). In case of such wireless LAN connection, data communication is normally performed at a data transfer rate of about 10 Mbps or higher.

Apparatuses for providing services and information, such as, for example, an application server, a content server, an ISP (Internet Service Provider) server, etc. are connected to the Internet 10. The mobile communication terminal 100 can receive various services and information through communications with these apparatuses, by connecting to the Internet 10 through cellular communication or wireless LAN connection.

Figure 2:
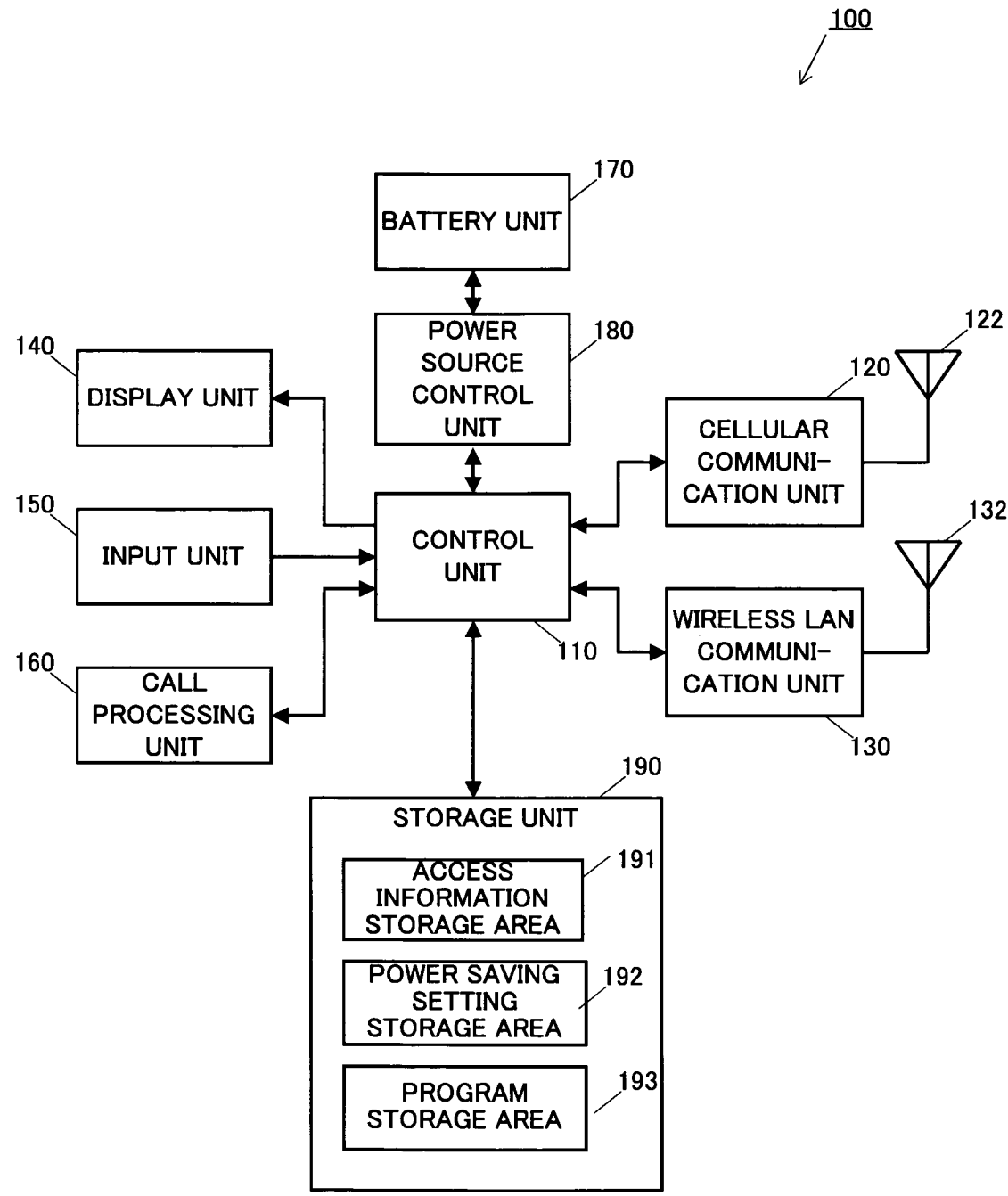
FIG. 2 is a block diagram showing the structure of a mobile communication terminal illustrated in FIG. 1.

The structure of the mobile communication terminal 100 according to the present embodiment will be explained with reference to FIG. 2. FIG. 2 is a block diagram showing the structure of the mobile communication terminal 100.

As illustrated, the mobile communication terminal 100 comprises a control unit 110, a cellular communication unit 120, an antenna 122, a wireless LAN communication unit 130, an antenna 132, a display unit 140, an input unit 150, a call processing unit 160, a battery unit 170, a power source control unit 180, a storage unit 190, etc.

The control unit 110 comprises, for example a CPU (Central Processing Unit), a RAM (Random Access Memory) which serves as a work area, etc., and controls each unit of the mobile communication terminal 100 by executing a predetermined operation program. That is, the respective components of the mobile communication terminal 100 are controlled by the control unit 110, and information transmission, etc. between the respective components are performed through the control unit 110.

The cellular communication unit 120 comprises, for example, a wireless communication device for mobile communication purposes. The cellular communication unit 120 performs voice communication or data communication through wireless communication with the cellular communication base station 25, by controlling transmission and reception of radio waves by the antenna 122, which is for wirelessly communicating with the cellular communication base station 25.

The wireless LAN communication unit 130 comprises a wireless communication device based on a wireless LAN standard such as, for example, IEEE802.11. The wireless LAN communication unit 130 performs data communication through wireless communication with the wireless LAN access point 30, by controlling transmission and reception of radio waves by the antenna 132, which is for wirelessly communicating with the wireless LAN access point 30.

The display unit 140 is a display output device comprising, for example, a liquid crystal display device. The display unit 140 displays and outputs images, etc. under the control of the control unit 110.

The input unit 150 comprises buttons, keys, etc. arranged on the external surface of the mobile communication terminal 100, and is operated by the user of the mobile communication terminal 100. The input unit 150 comprises an input circuit or the like connected to the buttons, keys, etc., and generates an input signal corresponding to an operation of the user and inputs it to the control unit 110.

The call processing unit 160 comprises, for example, a microphone and a speaker for inputting and outputting audios, and a codec circuit or the like, and performs audio processing related to the calling function of the mobile communication terminal 100. That is, the call processing unit 160 performs a call receiving operation of converting digital audio data received by the cellular communication unit 120 into an analog audio signal and outputting it from the speaker, a call sending operation of converting the voice of the user input from the microphone into digital audio data and sending it to the cellular communication unit 120, etc.

The battery unit 170 comprises a rechargeable battery such as a lithium-ion battery or the like, and a terminal for connecting the mobile communication terminal 100 and the battery, and supplies electricity necessary for the mobile communication terminal 100 to be driven.

The power source control unit 180 comprises a power source circuit, a controlling chip, etc. The power source control unit 180 controls operations related to the power source of the mobile communication terminal 100, based on an instruction from the control unit 110. For example, the power source control unit 180 feeds the power supplied from the battery unit 170 to each unit of the mobile communication terminal 100, or performs control of turning on/off the power source of the mobile communication terminal 100. Further, in accordance with an instruction from the control circuit 110, the power source control unit 180 detects a value of the electrical current, an amount of power stored, etc. based on the power supplied from the battery unit 170.

The storage unit 190 comprises storage devices such as a ROM (Read Only Memory), a flash memory, etc. The storage unit 190 stores an operation program to be executed by the control unit 110, and also stores various data necessary for realizing the present invention. According to the present embodiment, as illustrated in FIG. 2, a plurality of storage areas are prepared in the storage unit 190, and predetermined data is stored in each storage area. As illustrated, storage areas such as an access information storage area 191, a power saving setting storage area 192, a program storage area 193, etc. are prepared in the storage unit 190.

The access information storage area 191 is a storage area for storing information necessary for performing data communication by the mobile communication terminal 100. According to the present embodiment, for example, a wireless LAN connection information table as illustrated in FIG. 3A is provided. The wireless LAN connection information table stores configuration information necessary for connecting to the wireless LAN access point 30 in order to utilize a public wireless LAN service.

According to the present embodiment, a public wireless LAN service, which becomes available with the use of predetermined access information given from the provider beforehand, is assumed. Thus, for example, the wireless LAN connection information table has a record for each provider who provides a public wireless LAN service, as illustrated in FIG. 3A. Information provided from the provider and information set by the user are recorded in each record. For example, identification information (ESSID) prescribed by each provider and sent from the wireless LAN access point 30, an encryption key necessary for encrypting wireless communication with the wireless LAN access point 30, a login ID and a login password for logging in to the connection service provided by the provider, etc. are recorded in this record.

The power saving setting storage area 192 is an area for storing information related to power saving settings for reducing the power to be consumed by the mobile communication terminal 100. According to the present embodiment, for example, a power saving operation setting table as illustrated in FIG. 3B is provided in the power saving setting storage area 192, and power saving operation settings are recorded in the table. According to the present embodiment, at least power saving operation settings relating to the wireless LAN function and to the cellular communication function are recorded. That is, for example, the power saving operation setting table has a record for each function of the mobile communication terminal 100, as illustrated in FIG. 3B. In each record, a plurality of conditions and operations to be performed in correspondence with the respective conditions are recorded in association with each other. According to the present embodiment, a threshold for the battery remaining amount of the battery unit 170 is set as a condition for performing the power saving operation.

Figure 4:
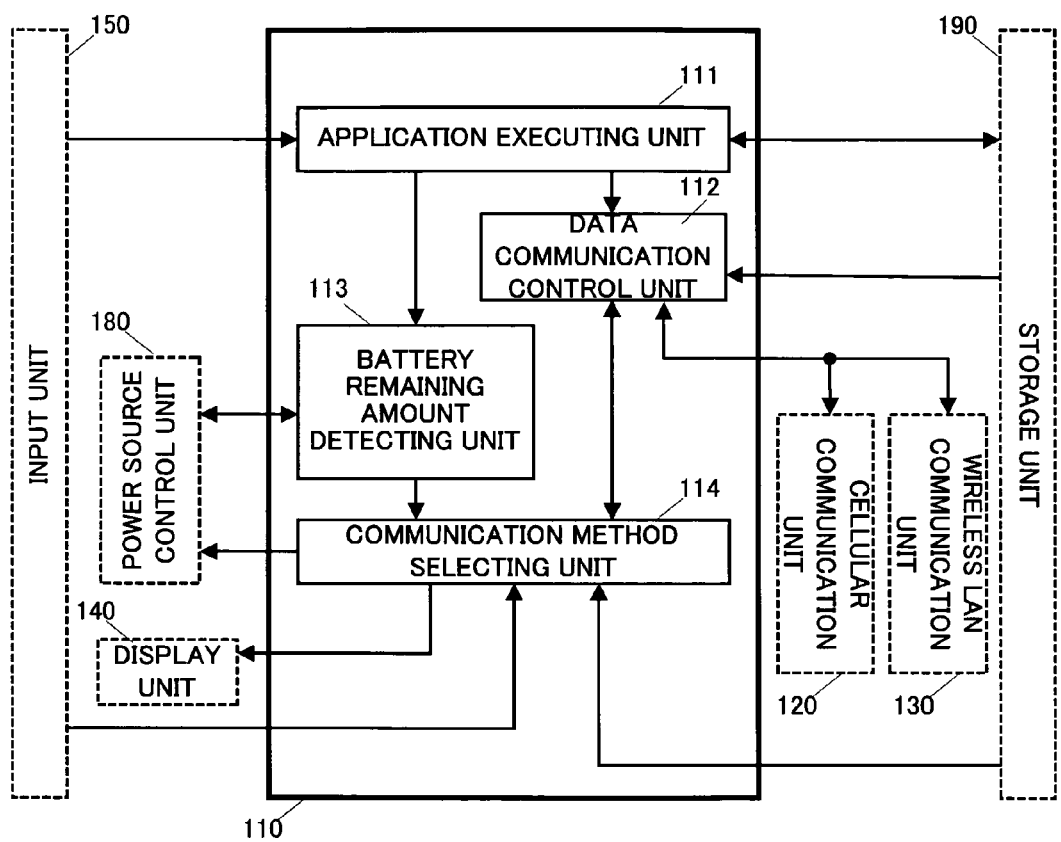
FIG. 4 is a functional block diagram showing a functional structure realized by a control unit illustrated in FIG. 2.

The program storage area 193 is an area for storing a program to be executed by the control unit 110. The program storage area 193 stores basic software (so-called OS) for controlling the operation of the entire mobile communication terminal 100, application software for realizing various functions of the mobile communication terminal 100, etc. According to the present embodiment, by the control unit 110 executing the program stored in the program storage area 193, the functional structure for performing the processes according to the present embodiment is realized. The functional structure realized by the control unit 110 is illustrated in FIG. 4. FIG. 4 is a functional block diagram showing the functional structure realized by the control unit 110.

As illustrated, the control unit 110 functions as an application executing unit 111, a data communication control unit 112, a battery remaining amount detecting unit 113, and a communication method selecting unit 114.

The application executing unit 111 executes an application designated by the user, in cooperation with the input unit 150. That is, the application executing unit 111 loads an application program corresponding to the application selected by the user operating the input unit 150, into the work area from the program storage area 193 and executes it. According to the present embodiment, the application executing unit 111 executes a data communication program such as, a so-called browser, for accessing a web site by connecting to the Internet 10.

The data communication control unit 112 controls the cellular communication unit 120 and the wireless LAN communication unit 130. The data communication control unit 112 instructs to perform an operation relating to the data communication function of the mobile communication terminal 100, and also determines the communication method which can be used when performing data communication. According to the present embodiment, the data communication control unit 112 determines whether or not a predetermined public wireless LAN service can be used, based on the identification information received by the wireless LAN communication unit 130 from the wireless LAN access point 30 and the information stored in the access information storage area 191. According to the present embodiment, upon the data communication application (the browser or the like) being executed by the application executing unit 111, the data communication control unit 112 determines whether or not wireless LAN connection is available.

The battery remaining amount detecting unit 113 detects the battery remaining amount in the battery unit 170 in cooperation with the power source control unit 180, based on a value of electric current or an amount of power stored, etc. which are detected by the power source control unit 180. According to the present embodiment, the battery remaining amount detecting unit 113 regularly detects the battery remaining amount in the battery unit 170, upon the execution of data communication application (the browser or the like) by the application executing unit 111.

The communication method selecting unit 114 performs an operation for selecting a communication method for data communication, based on the battery remaining amount detected by the battery remaining amount detecting unit 113. According to the present embodiment, the communication method selecting unit 114 performs the operation of selecting a communication method, by comparing the actual battery remaining amount and the threshold of the battery remaining amount set as a condition stored in the power saving setting storage area 192.

According to the present embodiment, the above-described functional structure is logically realized by the control unit 110 executing the program. However, these functions may be realized by a physical structure such as, for example, an ASIC (Application Specific Integrated Circuit) or the like.

The each of the above-described components is a main component necessary for realizing the present invention by means of the mobile communication terminal 100. Other components necessary as a mobile communication terminal are assumed to be provided as needed.

An operation to be performed by the mobile communication terminal 100 having the above-described structure will be explained below. Here, since the wireless LAN access point 30 for providing a public wireless LAN service is locally placed, the area in which the mobile communication terminal 100 can use the public wireless LAN service is limited. Further, generally, the range of the area (wireless LAN area) which can be covered by the wireless LAN access point 30 is smaller than the range of the area (cellular communication area) which is covered by the cellular communication base station 25. Accordingly, as illustrated in FIG. 1, the wireless LAN area exists within the cellular communication area. In this case, if the mobile communication terminal 100 is located within the wireless LAN area, the mobile communication terminal 100 can perform data communication both through cellular communication and through wireless LAN communication. According to the present embodiment, an operation of the mobile communication terminal 100, which is within the cellular communication area, will be explained below.

Figure 5:
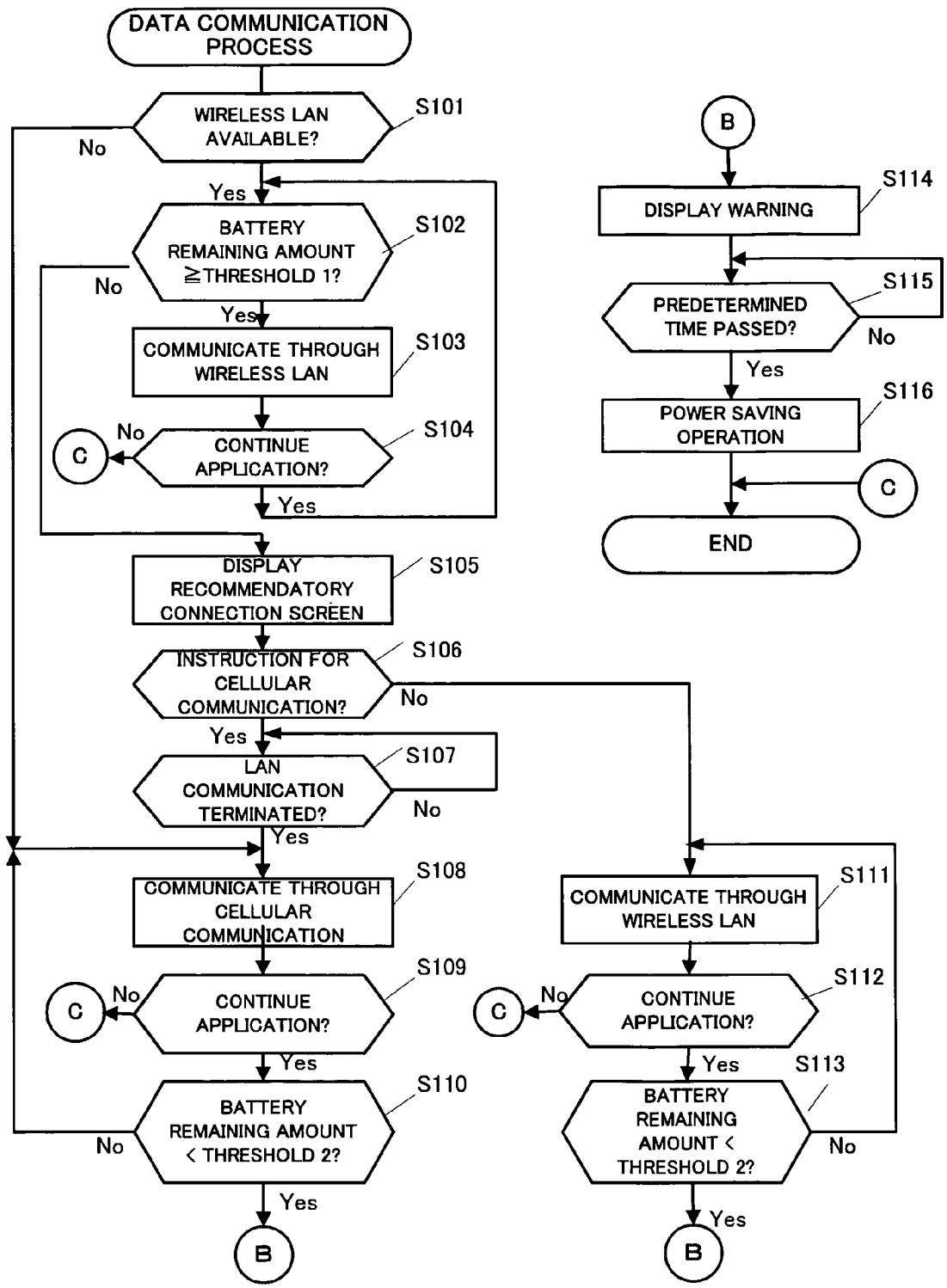
FIG. 5 is a flowchart for explaining a data communication process according to an embodiment of the present invention.

Here, with reference to a flowchart illustrated in FIG. 5, a data communication process performed by the mobile communication terminal 100 will be explained. This data communication process is started upon the execution of the application for data communication (the browser or the like) by the application executing unit 111 based on an operation by the user.

When the process is started, the application executing unit 111 notifies to the data communication control unit 112 and the battery remaining amount detecting unit 113 that the execution of the data communication application is started. The data communication control unit 112 activates the wireless LAN communication unit 130 in response to the notification from the application executing unit 111. The wireless LAN communication unit 130 starts receiving a beacon signal sent from the wireless LAN access point 30.

Here, in a case where the mobile communication terminal 100 is not within the wireless LAN area, the wireless LAN communication unit 130 receives no beacon signal. In this case, the data communication control unit 112 determines that no wireless LAN is available (step S101: No), and goes to the process of step S108. AS shown in FIG. 5, when the determination at step S101 is "No", i.e., when the wireless LAN is determined to not be available, the process flow proceeds to Step S108, skipping the battery remaining amount detection at step S102. That is, the battery Remaining amount is not detected if communication through the wireless LAN is not available.

To the contrary, in a case where the wireless LAN communication unit 130 receives a beacon signal, the data communication control unit 112 accesses the access information storage area 191 in the storage unit 190. Then, the data communication control unit 112 determines whether or not the mobile communication terminal 100 can communicate with a wireless LAN access point 30 of a public wireless LAN service which is usable by the mobile communication terminal 100, by checking whether or not the identification information notified by the beacon signal is recorded in the wireless LAN connection information table. In this case, if the obtained identification information is not recorded in the wireless LAN connection information table, the data communication control unit 112 determines that no wireless LAN is available (step S101: No), and goes to the process of step S108.

In a case where the wireless LAN communication unit 130 receives a beacon signal from the wireless LAN access point 30 and the identification information sent from the wireless LAN access point 30 is recorded in the wireless LAN connection information table, the data communication control unit 112 determines that a wireless LAN is available (step S101: Yes). In this case, the data communication control unit 112 notifies to the communication method selecting unit 114 that a wireless LAN is available.

In parallel with this, the battery remaining amount detecting unit 113 obtains information regarding the battery of the battery unit 170 from the power source control unit 180, upon receiving the notification from the application executing unit 111 that the execution of the application is started. Specifically, the battery remaining amount detecting unit 113 obtains information regarding the current battery remaining amount in the battery unit 170 from the power source control unit 180, and notifies it to the communication method selecting unit 114.

When receiving the battery remaining amount from the battery remaining amount detecting unit 113, the communication method selecting unit 114 determines whether or not the current battery remaining amount is equal to or greater than a threshold 1, which is a default value set as a condition for the power saving operation, by accessing the power saving setting storage area 192 of the storage unit 190 and referring to the setting information regarding the wireless LAN function in the power saving operation setting table (see FIG. 3B) (step S102). For example, the minimum battery remaining amount with which a stable operation can be achieved even when the wireless LAN function is activated, is set as threshold 1. A battery remaining amount lower than the threshold 1 is set as a threshold 2 (see FIG. 3B).

The communication method selecting unit 114 repeatedly performs step S103 and step S104 while the current battery remaining amount is equal to or greater than 1 (step S102: Yes). That is, first, the communication method selecting unit 114 selects wireless LAN as a communication method for the data communication to be performed, and notifies this to the data communication control unit 112. In response to the notification from the communication method selecting unit 114, the data communication control unit 112 accesses the access information storage area 191 of the storage unit 190, and obtains information regarding a usable public wireless LAN service from the wireless LAN connection information table. The data communication control unit 112 notifies the obtained information to the wireless LAN communication unit 130, and instructs a wireless LAN connection operation using this information. By this instruction, the wireless LAN communication unit 130 establishes connection to the wireless LAN access point 30 and starts data communication utilizing the executed application (step S103).

The started data communication through wireless LAN connection is performed until there occurs an application finishing operation in response to a finishing instruction from the user (step S104: No), or until the battery remaining amount becomes smaller than the threshold 1 (step S102: No). When the battery remaining amount becomes smaller than the threshold 1, the communication method selecting unit 114 displays an recommendatory connection screen as illustrated in FIG. 6A on the display unit 140 (step S105).

As described above, a battery remaining amount with which a stable operation is achieved even when the wireless LAN function is activated, is set as threshold 1. In a case where the battery remaining amount becomes smaller than the threshold 1 due to the power consumption by the data communication through wireless LAN connection, the operation might become unstable or a sufficient operation time might not be available. In this case, by switching the data communication from the wireless LAN connection to the cellular communication, it is possible to suppress the power to be consumed. Thus, when the battery remaining amount becomes smaller than the threshold 1 during connection to the wireless LAN, the communication method selecting unit 114 recommends the user to switch to the cellular communication and displays on the display unit 140, the recommendatory connection screen (FIG. 6A) for changing the communication method, thereby prompting the user to switch connections. The image data, etc. for this recommendatory connection screen are pre-stored in the storage unit 190.

Figure 6A:
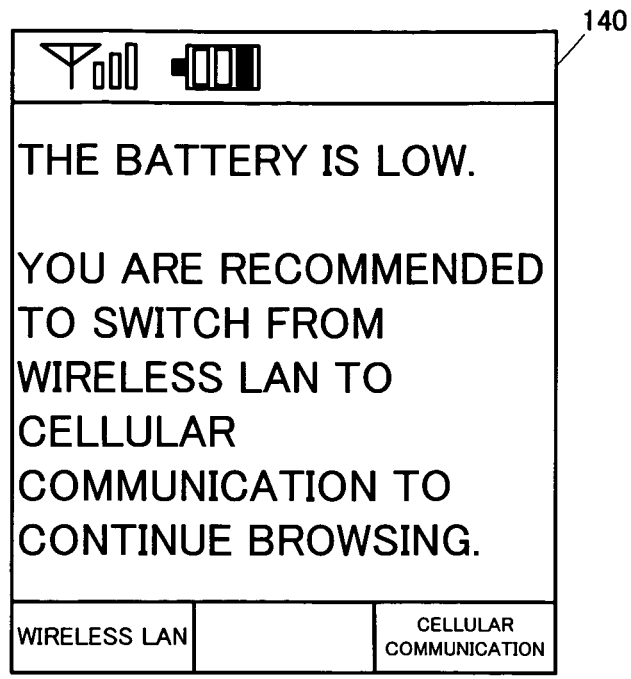
FIG. 6A is a diagram showing an example of a display screen output in the data communication process illustrated in FIG. 5, and shows an example of display of an recommendatory connection screen.

In this case, as illustrated in FIG. 6A, a message for recommending a switch to the cellular communication in order to perform data communication for a longer period, and buttons for selecting either the wireless LAN connection or the cellular communication are displayed on the recommendatory connection screen. As described above, wireless LAN connection consumes more electricity, but on the other hand enables the data communication to be performed at a higher data transfer rate than in case of the cellular communication. Accordingly, the user selects which method is suitable, based on the content of the data communication now being performed, etc. That is, the user selects the wireless LAN connection if he/she values a higher data transfer rate more than a longer operation time, and selects the cellular communication if he/she values a longer operation time even if the data transfer rate is low.

The user selects a desired communication method by operating the input unit 150, and instructs it to the mobile communication terminal 100. The communication method selecting unit 114 determines which communication method the user has selected, based on an input from the input unit 150 (step S106).

In a case where the user instructs to switch to the cellular communication (step S106: Yes), the communication method selecting unit 114 selects the cellular communication as the communication method of the data communication now being performed, and notifies this selection to the data communication control unit 112. The data communication control unit 112 controls the wireless LAN communication unit 130 to terminate (disconnect) the data communication through LAN communication started at step S103. Then, when it is determined that the data communication through LAN communication is terminated (step S107: Yes), the data communication control unit 112 starts the cellular communication using the cellular communication unit 120 (step S108) to continue the data communication.

Figure 6B:
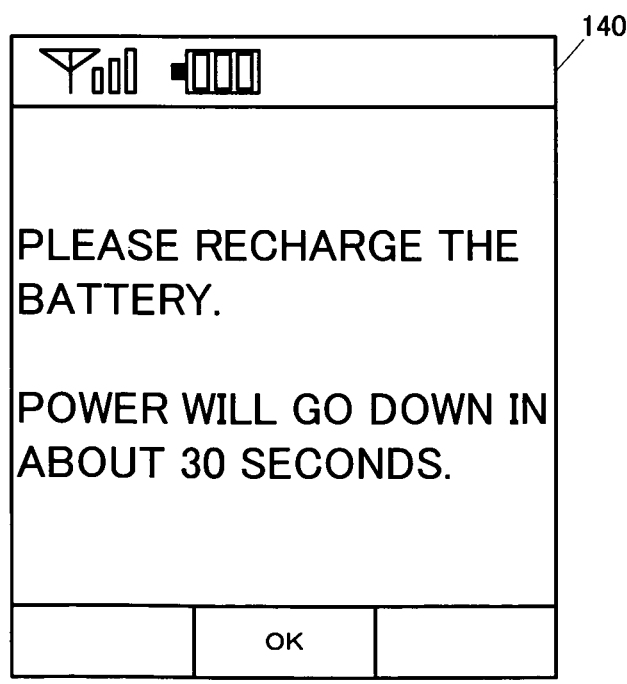
FIG. 6B is a diagram showing an example of a display screen output in the data communication process illustrated in FIG. 5, and shows an example of display of a warning screen.

Even after the switch to the cellular communication, the communication method selecting unit 114 monitors the battery remaining amount regularly until there is an instruction to finish the data communication (until it becomes No at step S109). Then, when the battery remaining amount becomes lower than the threshold 2 (condition 2) set in the power saving operation setting table (see FIG. 3B) in the power saving setting storage area 192 (step S110: Yes), the communication method selecting unit 114 displays a warning screen as illustrated in FIG. 6B on the display unit 140 (step S114).

The minimum battery remaining amount which is lower than the battery remaining amount set as the threshold 1 and with which a stable operation can be obtained throughout the entire mobile communication terminal 100 is set as the threshold 2. Thus, according to the present embodiment, for example, an operation of turning off the power source of the mobile communication terminal 100 in a predetermined time (for example, in 30 seconds) is set as the power saving operation in the case where the battery remaining amount becomes smaller than the threshold 2 (see FIG. 3B). Accordingly, when the battery remaining amount becomes smaller than the threshold 2, the communication method selecting unit 114 displays a warning screen which urges power recharging and shows a message that the power source will be turned off in a predetermined time, as illustrated in FIG. 6B. The image data, etc. for such a warning screen, are pre-stored in the storage unit 190.

Upon displaying the warning screen, the communication method selecting unit 114 starts timing the passage of time, by means of a predetermined timer circuit, an operation of a timer program, or the like. Then, the communication method selecting unit 114 determines whether or not the predetermined time, which is set in the power saving setting storage area 192 as the operation corresponding to the threshold 2, has passed (step S115).

In a case where the predetermined time has passed (step S115: Yes), the communication method selecting unit 114 instructs the power source control unit 180 to perform a power saving operation, based on the power saving operation set in correspondence with the threshold 2. In response to this, the power source control unit 180 performs the instructed power saving operation (step S116), and terminates the process. According to the present embodiment, since turning off of the power source is set as the power saving operation, the power source control unit 180 performs the operation of turning off the power source of the mobile communication terminal 100.

As described above, in performing data communication through Internet connection, if a wireless LAN is available and if the battery remaining amount is sufficient, wireless LAN connection is automatically selected and data communication is performed at a high data transfer rate. Then, in response to a decrease in the battery remaining amount, an operation for enabling a switch to the cellular communication is performed.

On the other hand, in a case where no wireless LAN is available at the time of starting data communication (step S101; No), the flow goes to step S108 to start connection through the cellular communication, and the operations of steps 109 to 110 and steps 114 to 116 are performed.

Even when a wireless LAN is available, the communication method selecting unit 114 compares with the predetermined threshold 1, the battery remaining amount at the time data communication is started, and goes to step S105 in a case where the battery remaining amount is smaller than the threshold 1 (step S102; No) in order to display a similar recommendatory connection screen to that illustrated in FIG. 6A, thereby allowing the user to select the communication method. In this case, if the wireless LAN connection is selected, connection through the wireless LAN communication is performed (step S111) as long as the battery remaining amount is equal to or greater than the threshold 2 (step S113; No). On the other hand, when the battery remaining amount becomes smaller than the threshold 2 (step S113; Yes), a warning is displayed (step S114) and a power saving operation is performed (step S115; Yes, step S116).

When an instruction for finishing the application is given, by the user or the like (step S104: No, step S109: No, step S112: No), during data communication, the process is terminated.

As explained above, by applying the present invention in the way of the above-described embodiment, it is possible for wireless LAN connection having a high communication performance to be selected when there is a sufficient amount of battery remaining, and to switch to the cellular communication consuming less power when the amount of battery remaining becomes scarce. That is, by switching the communication methods according to the battery remaining amount, it is possible to effectively reduce the power consumed by a mobile communication terminal having the wireless LAN communication function. Further, since the user can select to switch between the communication methods, a suitable communication method can be used depending on the situation of use at that time. Furthermore, even in a case where the amount of battery remaining further decreases and there is no choice but to turn off the power source, the warning screen is displayed and the power source is turned off after a predetermined time passes. Therefore, the user can appropriately finish the data communication after he/she carries out data storage, etc., and thus can prevent loss of data due to the power source being suddenly turned off while data communication is performed.

The above-described embodiment is an example, and the range of application of the present invention is not limited to this. That is, various applications are possible and embodiments of any kinds are included in the scope of the present invention.

For example, according to the above-described embodiment, during wireless LAN connection, the user is prompted to select a communication method when the battery remaining amount becomes smaller than the threshold 1, but the mobile communication terminal 100 may automatically select and switch to the cellular communication. That is, in a case where the communication method selecting unit 114 determines that the battery remaining amount is smaller than the threshold 1, method selecting unit 114 may automatically select the cellular communication and notify this to the data communication control unit 112, without displaying the recommendatory connection screen. After steadily finishing (disconnecting) the wireless LAN connection of the wireless LAN communication unit 130, the data communication control unit 112 controls the cellular communication unit 120 to continue performing the data communication, through the cellular communication.

Further, according to the above-described embodiment, it is determined, when the data communication is started, whether a wireless LAN is available or not. In addition to this, it may be determined whether or not the cellular communication is available. In this case, if a wireless LAN and the cellular communication are both available, the process shown in the above-described embodiment is performed. In a case where only the cellular communication is available, for example, the data communication is started automatically through the cellular communication. In a case where only a wireless LAN is available, for example, the data communication is started automatically through the wireless LAN, if the battery remaining amount is sufficient (equal to or greater than the threshold 1) at that time. In a case where only a wireless LAN is available and the battery remaining amount is scarce (smaller than the threshold 1), for example, the user selects whether to perform the data communication through the wireless LAN or to terminate the operation. Further, in a case where neither a wireless LAN nor the cellular communication is available, for example, a notification that the data communication cannot be performed is given.

Further, according to the above-described embodiment, even in a case where the user has not yet selected an operation which requires an application to perform data communication (for example, in a case where the user is browsing a browser screen already being displayed), the recommendatory connection screen is displayed at the timing the battery remaining amount becomes smaller than the threshold 1. However, the recommendatory connection screen may be displayed to prompt the user to switch the communication methods, at the timing when both the battery remaining amount becomes smaller than the threshold 1 and when the user selects an operation that requires the application to perform data communication (for example, when the user presses a "send" button of the browser). This allows the user to consider switching between communication methods only when selecting an operation that requires the application to perform data communication, thereby contributing to the improvement of operability.

According to the above-described embodiment, the use of a local public wireless LAN service utilizing a wireless LAN such as IEEE802.11 and the use of the cellular communication are switched. However, for example, communication through a wide area wireless LAN utilizing IEEE802.16a or the like and the cellular communication may be switched according to the battery remaining amount.

The various settings and display screens shown in the above-described embodiment are examples and not limited to these examples, thus settings and displays may be configured arbitrarily. The setting information stored in the storage unit 190 is set beforehand by, for example, the manufacturer of the mobile communication terminal 100. However, this is not the only case, and the user of the mobile communication terminal 100 may set or change the settings.

The above-described mobile communication terminal 100 is provided beforehand with the function for realizing the present invention. However, it is also possible to allow an existing mobile communication terminal which has no function for realizing the present invention, to function as the mobile communication terminal according to the present invention, by applying a program to such a mobile communication terminal. In this case, a program for performing the processes of the above-described mobile communication terminal 100 is applied to a mobile communication terminal which at least has a data communication function through cellular communication and a wireless LAN connection function. Then, this mobile communication terminal can function as the terminal device according to the present invention, by the program being executed by the computer (CPU or the like) which controls this mobile communication terminal.

The method for applying such a program is arbitrary. For example, the program may be applied to an arbitrary device by the program being provided through a communication medium such as the Internet, or may be distributed by storing the program in a predetermined recording medium (for example, a memory card, a CD-ROM, a DVD, etc.).

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Applications No. 2005-347035 filed on Nov. 30, 2005 and No. 2006-291047 filed on Oct. 26, 2006 and including specification, claims, drawings and summary. The disclosure of the above Japanese Patent Applications is incorporated herein by reference in its entirety.

What is claimed is:

1. A mobile communication terminal having a wireless local area network (LAN) connection function, comprising:
   a communication method determining unit configured to determine whether communication through a wireless LAN is available, upon a start of a data communication operation;
   a battery remaining amount detecting unit configured to detect a battery remaining amount of the mobile communication terminal;
   a communication method selecting unit configured to perform a battery-based selecting operation for selecting a communication method based on the battery remaining amount and which selects the wireless LAN to start the data communication operation through the wireless LAN if the battery remaining amount, detected by the battery remaining amount detecting unit at a time when the communication method determining unit determines that the wireless LAN is available, satisfies a predetermined condition for executing the data communication operation through the wireless LAN;
   an application executing unit configured to control the communication method selecting unit to continuously execute the battery-based selecting operation based on the battery remaining amount detected by the battery remaining amount detecting unit under a condition that an application for the data communication operation is continuously running through the wireless LAN, wherein the communication method selecting unit switches the communication method to cellular communication from the wireless LAN if the battery remaining amount is determined to not satisfy the predetermined condition; and
   a data communication control unit configured to control the data communication operation so that the data communication operation through the wireless LAN continues with data communication operation through the cellular communication if the communication method selecting unit switches the communication method to the cellular communication,
   wherein the application executing unit controls the communication method selecting unit to terminate the execution of the battery-based selecting operation in a case where the application for the data communication operation through the wireless LAN is not continuously running through the wireless LAN, even if the wireless LAN communication is available.

2. The mobile communication terminal according to claim 1, wherein the battery-based selecting operation based on the battery remaining amount detected by the battery remaining amount detecting unit compares the battery remaining amount with a predetermined first threshold to determine whether the predetermined condition for executing the data communication operation through the wireless LAN is satisfied.

3. The mobile communication terminal according to claim 2, wherein the battery-based selecting operation based on the battery remaining amount detected by the battery remaining amount detecting unit:
  determines that the predetermined condition for executing the data communication through the wireless LAN is satisfied if the battery remaining amount is equal to or greater than the predetermined first threshold; and
  determines that the predetermined condition for executing the data communication through the wireless LAN is not satisfied if the battery remaining amount is less than the predetermined first threshold.

4. The mobile communication terminal according to claim 2, further comprising:
  an output unit configured to provide an output which allows a user of the mobile communication terminal to select the communication method,
  wherein the output unit provides a recommendatory output recommending the user to select the cellular communication as the communication method for the data communication operation if the battery remaining amount is less than the predetermined first threshold, and
  wherein the communication method selecting unit switches the communication method to the cellular communication from the wireless LAN if the user selects the cellular communication as the communication method for the data communication operation after the output unit provides the recommendatory output.

5. The mobile communication terminal according to claim 4, wherein the output unit displays a screen which allows the user of the mobile communication terminal to select the communication method.

6. The mobile communication terminal according to claim 2, further comprising:
  an output unit configured to notify a warning to a user of the mobile communication terminal; and
  a control unit configured to control the output unit to output the warning to the user that a power source will be turned off, and configured to turn off the power source of the mobile communication terminal after a predetermined time passes if the battery remaining amount is less than a predetermined second threshold which is smaller than the predetermined first threshold.

7. The mobile communication terminal according to claim 6, wherein the output unit displays a screen to notify the warning to the user of the mobile communication terminal.

8. The mobile communication terminal according to claim 1, wherein the data communication control unit simultaneously activates two or more communication methods for the data communication operation including the communication method using the wireless LAN connection function and deactivates at least one of the communication methods that have been simultaneously activated for the data communication operation based on the battery remaining amount detected by the battery remaining amount detecting unit.

9. A mobile communication terminal having a wireless local area network (LAN) connection function, comprising:
  a communication method determining unit configured to determine whether communication through a wireless LAN is available, upon a start of a data communication operation;
  a battery remaining amount detecting unit configured to periodically detect a battery remaining amount of the mobile communication terminal when the communication method determining unit determines that communication through the wireless LAN is available, under a condition that execution of an application for the data communication operation is continuing through the wireless LAN; and
  a communication method selecting unit configured to perform a battery-based selecting operation for selecting a communication method to be used for the data communication operation, based on the battery remaining amount of the mobile communication terminal detected by the battery remaining amount detecting unit, wherein the communication method selecting unit switches the communication method to cellular communication from the wireless LAN if the battery remaining amount is determined to not satisfy the predetermined condition;
  wherein the battery remaining amount detecting unit does not perform the battery remaining amount detection if the communication method determining unit determines that communication through the wireless LAN is not available,
  wherein the communication method selecting unit terminates the execution of the battery-based selecting operation in a case where the application for the data communication operation through the wireless LAN is not continuously running through the wireless LAN, even if the wireless LAN communication is available.

10. The mobile communication terminal according to claim 9, further comprising:
  a data communication control unit configured to simultaneously activate two or more communication methods for the data communication operation including the communication method using the wireless LAN connection function and deactivate at least one of the communication methods that have been simultaneously activated for the data communication operation based on the battery remaining amount detected by the battery remaining amount detecting unit.

11. A non-transitory computer-readable recording medium storing a program for controlling a computer for controlling a mobile communication terminal having a wireless local area network (LAN) connection function, to realize:
  a function of determining whether communication through a wireless LAN is available, upon a start of a data communication operation;
  a function of detecting a battery remaining amount of the mobile communication terminal;
  a function of performing a battery-based selecting operation for selecting a communication method based on the battery remaining amount and which selects the wireless LAN to start the data communication operation through the wireless LAN if the battery remaining amount, detected at a time when the wireless LAN is determined to be available, satisfies a predetermined condition for executing the data communications through the wireless LAN;
  a function of continuously executing the battery-based selecting operation based on the detected battery remaining amount under a condition that an application for the data communication operation is continuously running through the wireless LAN, and switching the communication method to cellular communication from the wireless LAN if the battery remaining amount is determined to not satisfy the predetermined condition; and
  a function of controlling the data communication operation so that the data communication operation through the wireless LAN continues with data communication through the cellular communication operation if the communication method is switched to the cellular communication,
wherein the function of continuously executing the battery-based selecting operation controls the function of performing the battery-based selecting operation to terminate the execution of the battery-based selecting operation if the application for the data communication operation through the wireless LAN is not continuously running through the wireless LAN, even if the wireless LAN communication is available.

12. The non-transitory computer-readable recording medium storing the program according to claim 11, wherein the program controls the computer to further realize:
a function of simultaneously activating two or more communication methods for the data communication operation including the communication method using the wireless LAN connection function; and
a function of deactivating at least one of the communication methods that have been simultaneously activated for the data communication operation based on the detected battery remaining amount.

13. A non-transitory computer-readable recording medium storing a program for controlling a computer for controlling a mobile communication terminal having a wireless local area network (LAN) connection function, to realize:
a function of determining whether communication through a wireless LAN is available, upon a start of an application which performs a data communication operation;
a function of periodically detecting a battery remaining amount of the mobile communication terminal, when the communication through the wireless LAN is available, under a condition that execution of the application for the data communication operation is continuing through the wireless LAN;
a function of connecting to the available wireless LAN to perform communication, when the battery remaining amount is equal to or greater than a predetermined threshold; and
a function of performing an output for recommending communication through cellular communication, when the battery remaining amount becomes less than the threshold, wherein the detection of the battery remaining amount is not performed if communication through the wireless LAN is determined to not be available,
wherein the function of performing the output for recommending communication through cellular communication is terminated if the application for the data communication operation through the wireless LAN is not continuously running through the wireless LAN, even if the wireless LAN is available.

14. The non-transitory computer-readable recording medium storing the program according to claim 13, wherein the program controls the computer to further realize:
a function of simultaneously activating two or more communication methods for the data communication operation including the communication method using the wireless LAN connection function; and
a function of deactivating at least one of the communication methods that have been simultaneously activated for the data communication operation based on the detected battery remaining amount.

\* \* \* \* \*